(12) United States Patent
Yu et al.

(10) Patent No.: US 10,971,759 B2
(45) Date of Patent: Apr. 6, 2021

(54) DEVICE FOR BATTERY FORMATION

(71) Applicants: JIANGSU CONTEMPORARY AMPEREX TECHNOLOGY LIMITED, Liyang (CN); CONTEMPORARY AMPEREX TECHNOLOGY CO., LIMITED, Ningde (CN)

(72) Inventors: Wen Yu, Liyang (CN); Jian Chen, Liyang (CN); Jing Yang, Liyang (CN); Hua Zhang, Liyang (CN); Lin Chen, Liyang (CN)

(73) Assignees: JIANGSU CONTEMPORARY AMPEREX TECHNOLOGY, Liyang (CN); CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 54 days.

(21) Appl. No.: 16/548,586

(22) Filed: Aug. 22, 2019

(65) Prior Publication Data

US 2020/0411898 A1    Dec. 31, 2020

Related U.S. Application Data

(63) Continuation of application No. PCT/CN2019/095245, filed on Jul. 9, 2019.

(30) Foreign Application Priority Data

Jun. 28, 2019 (CN) .......................... 201921001625.4

(51) Int. Cl.
*H01M 10/058* (2010.01)
*H01M 10/44* (2006.01)
(Continued)

(52) U.S. Cl.
CPC ..... *H01M 10/058* (2013.01); *H01M 10/0404* (2013.01); *H01M 10/0525* (2013.01);
(Continued)

(58) Field of Classification Search
CPC .. H01M 50/258; H01M 50/70; H01M 10/058; H01M 10/0404; H01M 10/44; H01M 10/0525
See application file for complete search history.

(56) References Cited

U.S. PATENT DOCUMENTS

2020/0122301 A1* 4/2020 Rathmann ........... H01M 2/1077
2020/0411899 A1* 12/2020 Yu ..................... H01M 10/0404

FOREIGN PATENT DOCUMENTS

CN    206210942 U    5/2017
CN    206340598 U    7/2017
(Continued)

OTHER PUBLICATIONS

Machine translation of CN 108899457 (no date).*
(Continued)

*Primary Examiner* — Amanda C. Walke
(74) *Attorney, Agent, or Firm* — Morgan, Lewis & Bockius LLP (57) ABSTRACT

The present disclosure provides a device for battery formation, which comprises a base plate, a press plate, a positioning block and a connecting assembly. The press plate is connected with the base plate, the positioning block and the connecting assembly each are provided as plurality in number and the plurality of the connecting assemblies correspond to the plurality of positioning blocks. The positioning block has a main portion and a protruding portion, the main portion is provided between the base plate and the press plate, and the protruding portion extends from a surface of the main portion away from the press plate. The base plate
(Continued)

is provided with a plurality of positioning holes, and the protruding portion of each positioning block is inserted into the positioning hole. Each connecting assembly is provided to the main portion of a corresponding positioning block and used for being connected to a battery.

18 Claims, 6 Drawing Sheets

(51) Int. Cl.
*H01M 10/04* (2006.01)
*H01M 10/0525* (2010.01)
*H01M 50/70* (2021.01)
*H01M 50/258* (2021.01)

(52) U.S. Cl.
CPC ......... *H01M 10/44* (2013.01); *H01M 50/258* (2021.01); *H01M 50/70* (2021.01)

(56) References Cited

FOREIGN PATENT DOCUMENTS

| CN | 206422143 U | | 8/2017 |
| CN | 207233883 U | * | 4/2018 |
| CN | 108666624 A | | 10/2018 |
| CN | 212113922 U | * | 8/2020 |
| CN | 108808102 B | * | 10/2020 |

OTHER PUBLICATIONS

Machine translation of CN 209029492 (no date).*
Machine translation of CN 212113922 (no date).*
International Search Report from PCT 2019/095245 and WO 2020/258376 (no date).*
Written Opinion from WO 2020/258377 A1 (no date).*
Machine translation of CN 207233883 (no date).*
Machine translation of CN 108808102 (no date).*

* cited by examiner

DEVICE FOR BATTERY FORMATION

CROSS REFERENCE TO RELATED APPLICATIONS

This application is a continuation application of PCT/CN2019/095245, filed on Jul. 9, 2019, which claims priority to Chinese Patent Application No. 201921001625.4, filed with the National Intellectual Property Administration of the People's Republic of China on Jun. 28, 2019, all of which are incorporated herein by reference in their entirety.

FIELD OF THE PRESENT DISCLOSURE

The present disclosure relates to the field of battery production, and particularly relates to a device for battery formation.

BACKGROUND OF THE PRESENT DISCLOSURE

In the production process of lithium-ion battery, the formation process plays a key role on the quality of the battery. In the formation process, a large amount of gases are generated in the battery, so it needs a corresponding device for formation to degas timely. Specifically, it can connect the device for formation to an electrolyte injection hole of the battery, and then degas the battery by using the negative pressure of a vacuuming device. However, the model changing process of the known device for formation is complex, which leads to the efficiency of the battery formation process low.

SUMMARY OF THE PRESENT DISCLOSURE

In view of the problem existing in the background, an object of the present disclosure is to provide a device for battery formation, which can simplify the production process and improve efficiency.

In order to achieve the above object, the present disclosure provides a device for battery formation, which comprises a base plate, a press plate, a positioning block and a connecting assembly. The press plate is connected with the base plate, the positioning block and the connecting assembly each are provided as plurality in number and the plurality of the connecting assemblies correspond to the plurality of positioning blocks. The positioning block has a main portion and a protruding portion, the main portion is provided between the base plate and the press plate, and the protruding portion extends from a surface of the main portion away from the press plate. The base plate is provided with a plurality of positioning holes, and the protruding portion of each positioning block is inserted into the positioning hole. Each connecting assembly is provided to the main portion of a corresponding positioning block and used for being connected to a battery.

The main portion is provided with a first through-hole. The connecting assembly comprises a first connecting pipe and a nozzle, one end of the first connecting pipe is connected with the nozzle, the other end of the first connecting pipe passes through the first through-hole of the main portion and is connected with the main portion. The nozzle sheathes one end of the first connecting pipe, and an outer diameter of the other end of the first connecting pipe away from the nozzle is larger than a diameter of the first through-hole. The connecting assembly further comprises a spring, the spring sheathes the first connecting pipe and is positioned between the nozzle and the main portion.

The first connecting pipe is a metal pipe.

The connecting assembly further comprises a second connecting pipe, the second connecting pipe is connected with one end of the first connecting pipe away from the nozzle. The second connecting pipe is a flexible pipe.

The nozzle is positioned at a side of the press plate away from the base plate. The press plate is provided with a second through-hole in the shape of strip, the base plate is provided with a third through-hole in the shape of strip, the second through-hole and the third through-hole are respectively positioned at two sides of the first through-hole. The first connecting pipes of the plurality of connecting assemblies pass through the second through-hole, and the third through-hole exposes one end of the first connecting pipe away from the nozzle.

The base plate has a groove, the groove is recessed relative to a surface of the base plate close to the press plate. At least a part of the main portion of the positioning block is received in the groove. The third through-hole and the positioning hole are formed to a bottom wall of the groove away from the press plate.

The number of the positioning holes is greater than the total number of the protruding portions.

The protruding portion of each positioning block is provided as plurality in number.

The device for battery formation further comprises a negative pressure mechanism, the negative pressure mechanism is positioned at a side of the base plate away from the press plate, and the negative pressure mechanism is connected with the base plate. The plurality of connecting assemblies are connected with the negative pressure mechanism.

The present disclosure has the following beneficial effects: the device for battery formation of the present disclosure can connect the vacuuming device and batteries, and degas the batteries in the formation process. At the same time, in the present disclosure, the positioning blocks are fixed by the fit between the base plate and the press plate, so when assembling or disassembling the positioning blocks, it only needs to rotating the bolts between the press plate and the base plate, and there is no need to provide fasteners to each positioning block. Therefore, the assembling and the disassembling of the positioning blocks of the present disclosure are convenient, thereby effectively simplifying the production process and improving efficiency.

Reference numerals in figures are represented as follows:
1 base plate
   11 positioning hole
   12 groove
2 press plate
3 positioning block
   31 main portion
   32 protruding portion
4 connecting assembly
   41 first connecting pipe
   42 nozzle
   43 spring
   44 second connecting pipe
5 negative pressure mechanism
   51 negative pressure container
      511 connecting portion
         511a protrusion
   52 covering plate
   53 separating plate
   54 limiting member
   55 connection joint
      551 flange
         551a notch
      552 first extending portion
      553 second extending portion
   56 fastener
6 suction joint
7 support plate
8 battery
S receiving cavity
S1 sub-cavity
S2 collecting cavity
H1 first through-hole
H2 second through-hole
H3 third through-hole
H4 fourth through-hole
H5 fifth through-hole
H6 sixth through-hole
X length direction
Y width direction
Z height direction

DETAILED DESCRIPTION

To make the object, technical solutions and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second", "third" and the like are only used for illustrative purposes and are not to be construed as expressing or implying a relative importance. The term "plurality" is two or more. Unless otherwise defined or described, the term "connect" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "above", "below" and the like, are described based on orientations illustrated in the figures, but are not intended to limit the embodiments of the present disclosure. Hereinafter the present disclosure will be further described in detail in combination with the exemplary embodiments and the figures.

A device for battery formation of the present disclosure can be used for a formation process of battery 8; specifically, the device for battery formation can be used for degassing the battery 8 in the process of formation. The battery 8 may be a lithium-ion battery. The battery 8 may comprise a case, an electrode assembly and an electrolyte, the electrode assembly and the electrolyte are received in the case.

Figure 1:
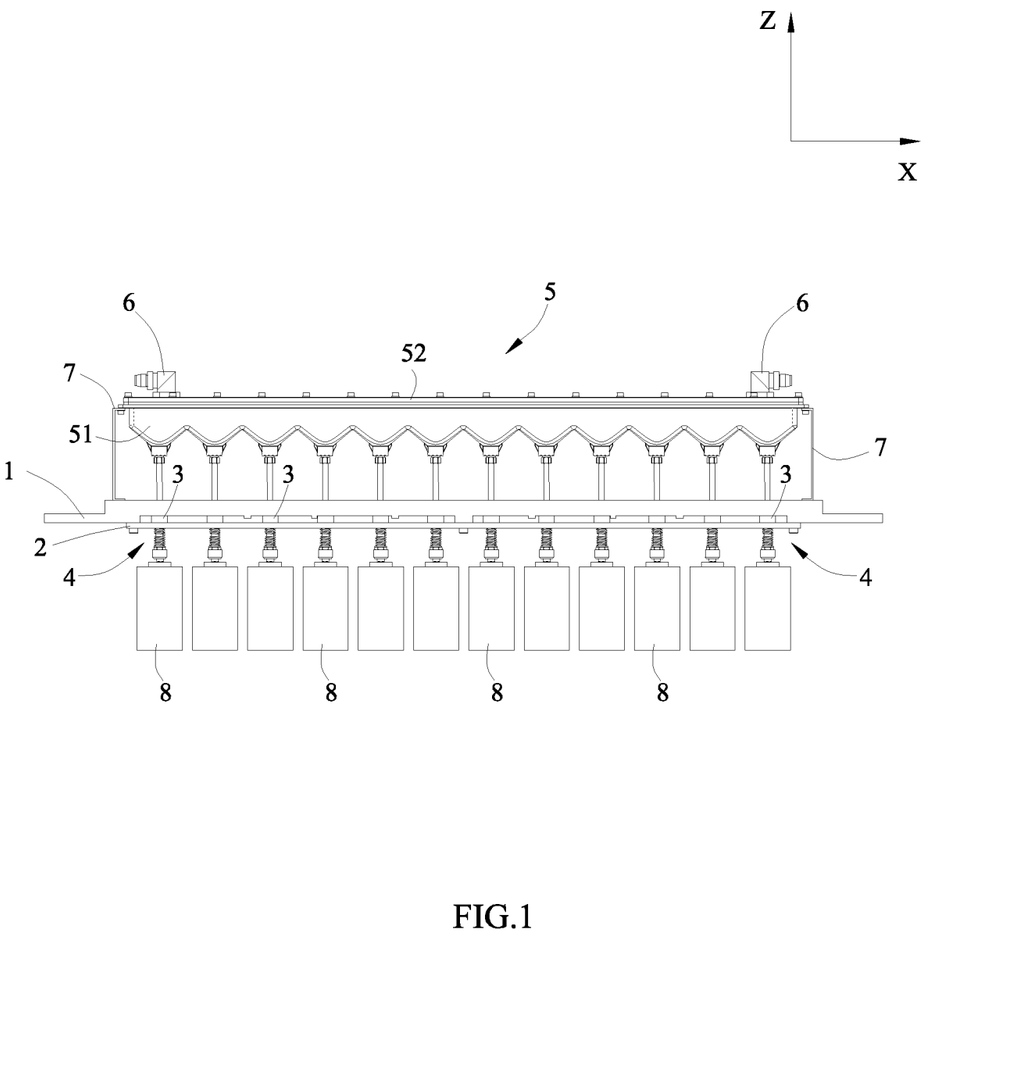
FIG. 1 is a schematic view of a device for battery formation according to the present disclosure.
Figure 2:
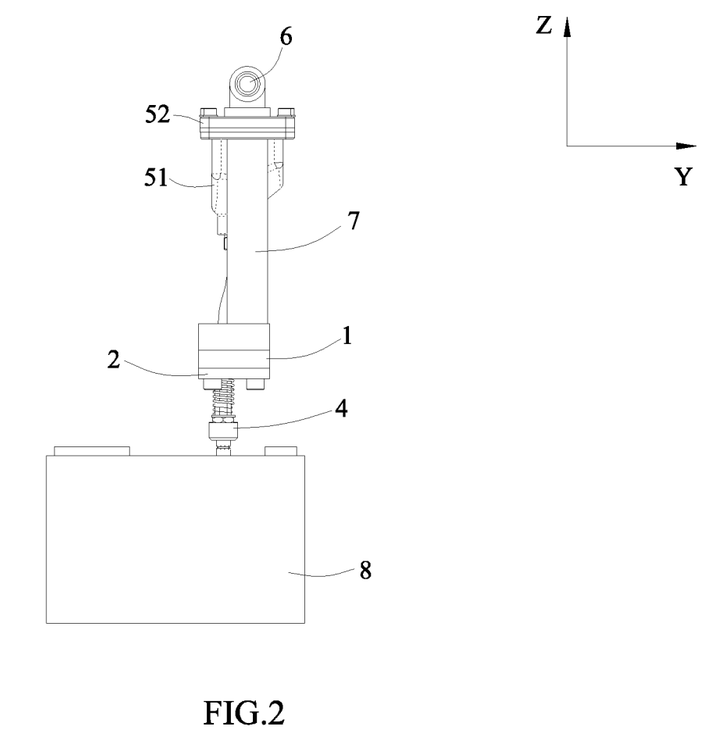
FIG. 2 is another schematic view of the device for battery formation according to the present disclosure.
Figure 3:
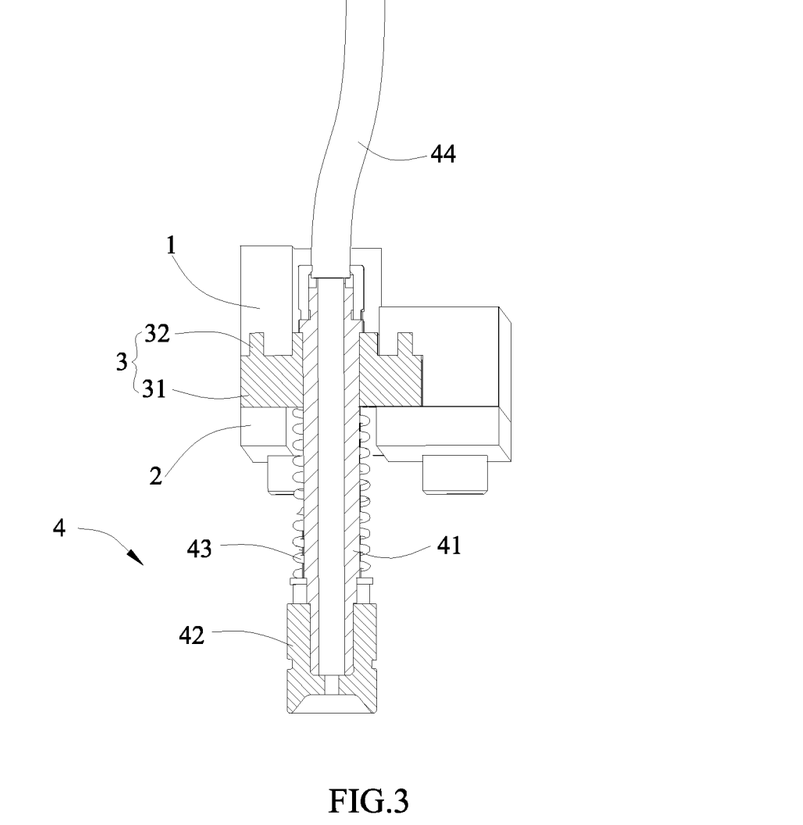
FIG. 3 is a schematic view of a connecting assembly of the device for battery formation according to the present disclosure.

Referring to FIG. 1 to FIG. 3, the device for battery formation of the present disclosure comprises a base plate 1, a press plate 2, a positioning block 3 and a connecting assembly 4.

The base plate 1 may be fixed to an external frame by bolts. The press plate 2 is connected with the base plate 1; preferably, the press plate 2 is positioned below the base plate 1 in an height direction Z and connected with the base plate 1 by bolts.

Figure 4:
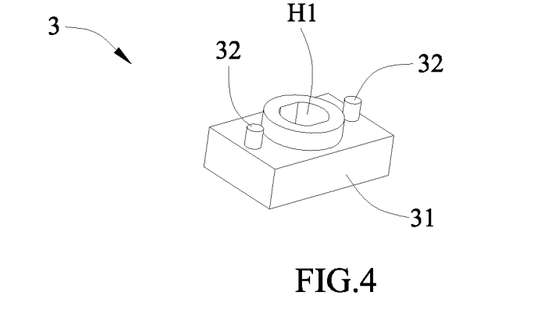
FIG. 4 is a schematic view of a positioning block of the device for battery formation according to the present disclosure.
Figure 5:
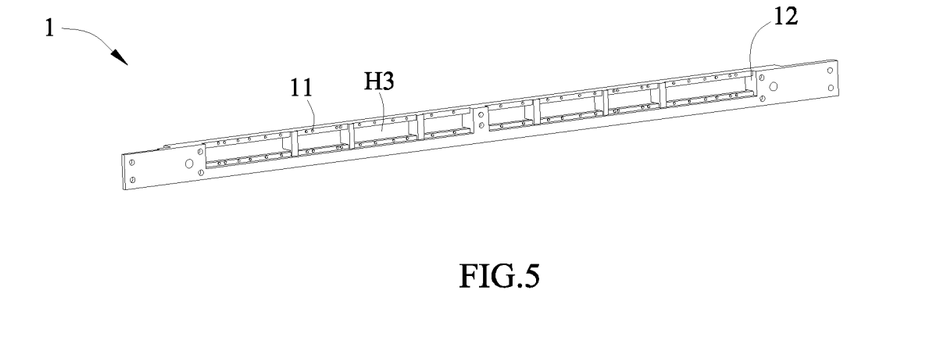
FIG. 5 is a schematic view of a base plate of the device for battery formation according to the present disclosure.

The positioning block 3 is provided as plurality in number and the plurality of positioning blocks 3 are positioned between the base plate 1 and the press plate 2. Specifically, referring to FIG. 3 and FIG. 4, the positioning block 3 has a main portion 31 and a protruding portion 32, the main portion 31 is provided between the base plate 1 and the press plate 2, and the protruding portion 32 extends from a surface of the main portion 31 away from the press plate 2. Referring to FIG. 5, the base plate 1 is provided with a plurality of positioning holes 11, and the protruding portion 32 of each positioning block 3 is inserted into the positioning hole 11.

The press plate 2 and the base plate 1 may be connected by bolts. By rotating the bolts, it can adjust a distance between the press plate 2 and the base plate 1 in the height direction Z. When it needs to install the positioning blocks 3, the bolts are loosened to increase the distance between the press plate 2 and the base plate 1, then the positioning blocks 3 are positioned on the press plate 2, and the protruding portion 32 of the positioning block 3 is made to correspond to the positioning hole 11 of the base plate 1. Finally, the distance between the press plate 2 and the base plate 1 is decreased by tightening the bolts, so that the protruding portion 32 is inserted into the positioning hole 11 and the main portion 31 is clamped between the press plate 2 and the base plate 1.

The connecting assembly 4 is provided as plurality in number, and each connecting assembly 4 is provided to the main portion 31 of a corresponding positioning block 3. The connecting assembly 4 is used for connecting a battery 8 and a vacuuming device. Specifically, one end of the connecting assembly 4 can be connected with the vacuuming device, the other end of the connecting assembly 4 can be connected with an electrolyte injection hole of the battery 8, and the electrolyte injection hole is used for injecting an electrolyte into the battery 8 in the process of producing the battery 8. The connecting assembly 4 has a passage inside; the passage communicates the vacuuming device and the inner space of the battery 8.

When the batteries 8 need to be formatted, the batteries 8 are positioned to a jig below the press plate 2 in the height direction Z; then an external power device, such as motor, cylinder and the like, moves the batteries 8 upwardly via the jig; correspondingly, when the electrolyte injection hole of battery 8 is communicated with the passage of the connecting assembly 4, the power device stops working, then the vacuuming device starts and the formation process of the batteries begins. When the formation process is finished, the power device moves the batteries 8 downwardly, so as to separate the connecting assembly 4 and the battery 8.

In conclusion, the device for battery formation of the present disclosure can connect the vacuuming device and batteries 8, and degas the batteries 8 in the formation process. At the same time, in the present disclosure, the positioning blocks 3 are fixed by the fit between the base plate 1 and the press plate 2, so when assembling or disassembling the positioning blocks 3, it only needs to rotating the bolts between the press plate 2 and the base plate 1, and there is no need to provide fasteners to each positioning block 3. Therefore, the assembling and the disassembling of the positioning blocks 3 of the present disclosure are convenient, thereby effectively simplifying the production process and improving efficiency.

The protruding portion 32 of each positioning block 3 is provided as plurality in number, and the plurality of protruding portions 32 can avoid the rotation of the main portion 31. Preferably, the protruding portion 32 of each positioning block 3 is provided as two in number.

The number of the positioning holes 11 is greater than the total number of the protruding portions 32 of the positioning blocks 3. Referring to FIG. 5, the base plate 1 may be provided with two rows of positioning holes 11, two protruding portions 32 of the positioning block 3 are respectively inserted into two rows of positioning holes 11.

In the production process of battery, it generally needs to format the batteries 8 in different models. When model of the batteries 8 changes, the positions of the electrolyte injection holes will change correspondingly. Therefore, in order to adapt the change of the batteries 8, the positions of the connecting assemblies 4 and the positions of the positioning blocks 3 need to change correspondingly too. The base plate 1 in the present disclosure is provided with a plurality of positioning holes 11, the positioning holes 11 correspond to the batteries 8 in different models. When the model of the batteries 8 changes, it only needs to move the positioning blocks 3 to the positioning holes 11 corresponding to the batteries 8 in the new model. Therefore, the device for battery formation of the present disclosure has a better versatility.

The main portion 31 is provided with a first through-hole H1. The connecting assembly 4 comprises a first connecting pipe 41 and a nozzle 42, one end of the first connecting pipe 41 is connected with the nozzle 42, the other end of the first connecting pipe 41 passes through the first through-hole H1 of the main portion 31 and is connected with the main portion 31. The positioning block 3 is capable of fixing the first connecting pipe 41.

When the batteries 8 need to be formatted, it moves the batteries 8 upwardly; when the nozzle 42 covers the electrolyte injection hole of the battery 8, it starts the vacuuming device. The nozzle 42 is in form of two layers and provided with two layers of gaskets inside and has a better sealing performance. In the formation process, the nozzle 42 can cover the electrolyte injection hole of the battery 8 from outside or be inserted into the electrolyte injection hole.

The nozzle 42 sheathes one end of the first connecting pipe 41, and the first connecting pipe 41 may be inserted into a through-hole with step in the nozzle 42 and fixed with the nozzle 42 by interference fit. An outer diameter of the other end of the first connecting pipe 41 away from the nozzle 42 is larger than a diameter of the first through-hole H1, so the other end of the first connecting pipe 41 may abut on the main portion 31. The first connecting pipe 41 is capable of sliding along the first through-hole H1.

The connecting assembly 4 further comprises a spring 43, the spring 43 sheathes the first connecting pipe 41 and is positioned between the nozzle 42 and the main portion 31.

When the battery 8 needs to be formatted, it moves the battery 8 upwardly; when the nozzle 42 contacts the battery 8, the battery 8 keeps moving upwardly at a certain distance and in turn moves the nozzle 42 upwardly. When the positioning block 3 abuts the spring 43 from above and provides a support force to the spring 43, the spring 43 is compressed by the force; at the same time, an elastic force of the spring 43 presses the nozzle 42 on the battery 8 tightly, so as to ensure the sealing performance between the nozzle 42 and the battery 8. Meanwhile, the spring 43 may be in the function of buffer, and avoid the nozzle 42 damaging the battery 8.

The first connecting pipe 41 is a metal pipe, such as a stainless steel pipe. The metal pipe has a high strength, thereby avoiding the first connecting pipe 41 being bent in the process of moving up and down, and ensuring that the nozzle 42 faces the electrolyte injection hole of the battery 8 up and down.

Generally, the position of the vacuuming device is fixed; when model of the battery 8 changes, the position of the positioning block 3 needs to change correspondingly too. The first connecting pipe 41 is a metal pipe, if the first connecting pipe 41 is directly connected with the vacuuming device, in the movement of the positioning block 3, the first connecting pipe 41 can not bend, and is difficult to adapt model change of the battery 8.

Therefore, preferably, the connecting assembly 4 further comprises a second connecting pipe 44, the second connecting pipe 44 is connected with one end of the first connecting pipe 41 away from the nozzle 42. The second connecting pipe 44 is a flexible pipe. One end of the second connecting pipe 44 is connected with the first connecting pipe 41 via a joint nut, and the other end of the second connecting pipe 44 is connected with the vacuuming device via a joint nut.

The flexible pipe has a larger length and is easy to bend, so when model of the battery 8 changes, the positioning block 3 and the first connecting pipe 41 can move freely. The material of the second connecting pipe 44 may be PTFE.

Figure 6:
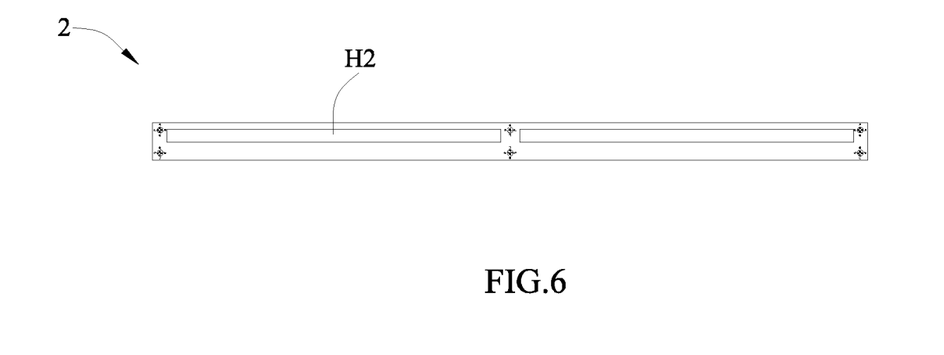
FIG. 6 is a schematic view of a press plate of the device for battery formation according to the present disclosure.

The nozzle 42 is positioned at a side of the press plate 2 away from the base plate 1. The press plate 2 is provided with a second through-hole H2 in the shape of strip, the base plate 1 is provided with a third through-hole H3 in the shape of strip, the second through-hole H2 and the third through-hole H3 are respectively positioned at two sides of the first through-hole H1. The base plate 1, the press plate 2 and the nozzle 42 are arranged in the height direction Z, and the second through-hole H2 and the third through-hole H3 are respectively positioned at two sides of the first through-hole H1 in the height direction Z.

The first connecting pipes 41 of the connecting assemblies 4 are capable of passing through the second through-hole H2. By providing the second through-hole H2, it can avoid the interference between the press plate 2 and the first connecting pipe 41. Because the second through-hole H2 has a large length, so when the position of the positioning block 3 changes, the first connecting pipe 41 can slide freely in the second through-hole H2.

The third through-hole H3 exposes one end of the first connecting pipe 41 away from the nozzle 42. By providing the third through-hole H3, it can connect the second connecting pipe 44 and the first connecting pipe 41 conveniently. The third through-hole H3 has a larger length, so when the position of the positioning block 3 changes, the end of the first connecting pipe 41 away from the nozzle 42 can slide freely in the third through-hole H3.

Referring to FIG. 5, the base plate 1 has a groove 12, the groove 12 is recessed relative to a surface of the base plate 1 close to the press plate 2. At least a part of the main portion 31 of the positioning block 3 is received in the groove 12. The third through-hole H3 and the positioning hole 11 are formed to a bottom wall of the groove 12 away from the press plate 2. By providing the groove 12, it can save space in the height direction Z; at the same time, the press plate 2 may be attached on the surface of the base plate 1, so as to position and install the press plate 2 conveniently.

Referring to FIG. 1, the device for battery formation further comprises a negative pressure mechanism 5, the negative pressure mechanism 5 is positioned at a side of the base plate 1 away from the press plate 2, and the negative pressure mechanism 5 is connected with the base plate 1. The negative pressure mechanism 5 may be connected to the base plate 1 via a support plate 7, and the support plate 7 separates the base plate 1 and the negative pressure mechanism 5 in the height direction Z. The connecting assemblies 4 are connected with the negative pressure mechanism 5. The negative pressure mechanism 5 can degas the batteries 8 via the connecting assemblies 4.

Figure 8:
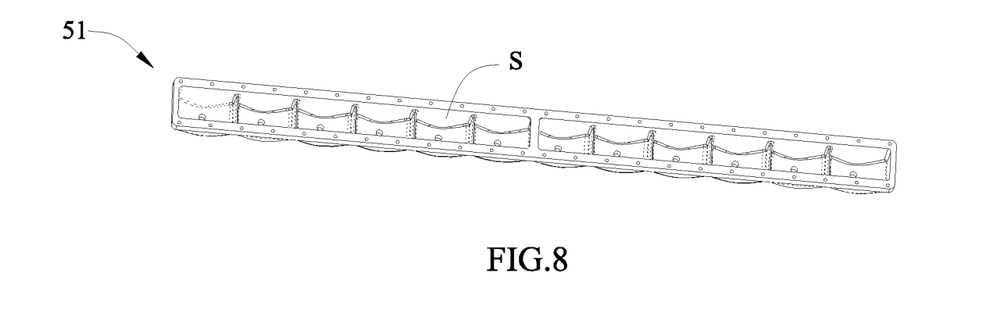
FIG. 8 is a schematic view of a negative pressure container of the negative pressure mechanism of the device for battery formation according to the present disclosure.

Specifically, referring to FIG. 8, the negative pressure mechanism 5 has a receiving cavity S inside. Referring to FIG. 1, the device for battery formation of the present disclosure further comprises a suction joint 6, the suction joint 6 is provided to the negative pressure mechanism 5 and communicated with the receiving cavity S. The suction joint 6 is capable of being connected to the vacuuming device outside, and the suction joint 6 has a passage inside communicated with the receiving cavity S. The vacuuming device may degas the receiving cavity S via the suction joint 6, so as to keep the receiving cavity S in a negative pressure state. Each connecting assembly 4 is communicated with the receiving cavity S.

When the batteries 8 need to be formatted, it moves the batteries 8 upwardly to make the nozzle 42 of each connecting assembly 4 cover the electrolyte injection hole of the battery 8. Then cyclically charges and discharges the batteries 8 and starts the vacuuming device. Gases are generated in the batteries 8 in the process of charge and discharge, and the vacuuming device can degas the batteries 8 via the suction joint 6, the receiving cavity S and the connecting assemblies 4, thereby avoiding the gases being remained in the electrode assemblies.

However, in the degassing process, the electrolytes in the batteries may be brought out by the gases. In the present disclosure, the receiving cavity S is provided between the vacuuming device and batteries 8, and the electrolytes brought out by the gases can be stored in the receiving cavity S. When the formation process is finished and the vacuuming device breaks the vacuum state, the electrolytes in the receiving cavity S flow back to the batteries 8 via the connecting assemblies 4.

In the known technology, it generally provides one independent container similar to the negative pressure mechanism of the present disclosure to each battery, the receiving cavity of each container receives the electrolyte of one corresponding battery. However, a gap exists between adjacent containers, the gap leads to the containers occupying a large space; at the same time, the capacity of the receiving cavity of each container becomes smaller, so the compatibility is poor. When model of the batteries changes, it needs to assemble or disassemble a plurality of containers at the same time, which leads to the model changing process complex and seriously influences the efficiency of the battery formation process.

In the present disclosure, it integrates a plurality of connecting assemblies 4 to one negative pressure mechanism 5, and stores the electrolytes of the batteries 8 by using the receiving cavity S of the negative pressure mechanism 5. Therefore, compared to the known technology, the negative pressure mechanism 5 of the present disclosure occupies a smaller space, and the receiving cavity S inside the negative pressure mechanism 5 has a larger capacity, thereby improving the compatibility of the device for battery formation of the present disclosure. In addition, when the model of the batteries 8 changes, it only needs to adjust the positioning blocks 3 and the connecting assemblies 4, and there is no need to assemble or disassemble the negative pressure mechanism 5, thereby simplifying the model changing process, improving the efficiency of the battery formation.

Figure 7:
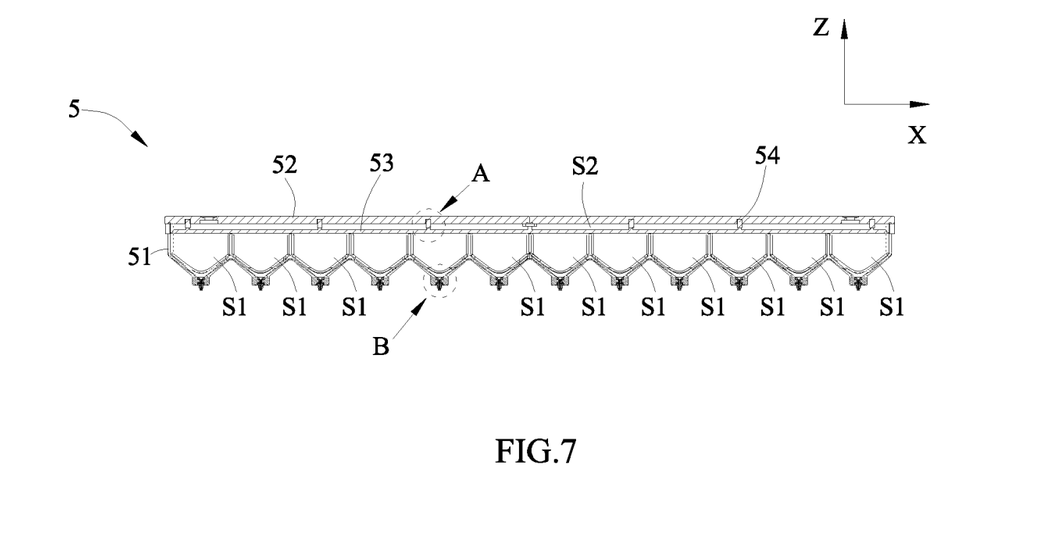
FIG. 7 is schematic view of a negative pressure mechanism of the device for battery formation according to the present disclosure.

Referring to FIG. 7, the negative pressure mechanism 5 comprises a negative pressure container 51 and a covering plate 52, the receiving cavity S is formed in the negative pressure container 51, the covering plate 52 is connected with the negative pressure container 51 and seals the receiving cavity S. The covering plate 52 can be connected with the negative pressure container 51 by a bolt; a gasket may be provided between the covering plate 52 and the negative pressure container 51, so as to promote the sealing performance and improve the degassing efficiency of the vacuuming device. The negative pressure container 51 can be injection molded by polyvinylidene fluoride.

The covering plate 52 and the negative pressure container 51 may be arranged up and down in the height direction Z. The suction joint 6 is connected with the covering plate 52; the connecting assembly 4 is connected with the negative pressure container 51. Preferably, the suction joint 6 is positioned above the covering plate 52 in the height direction Z, the connecting assembly 4 is positioned below the negative pressure container 51 in the height direction Z.

The receiving cavity S comprises a sub-cavity S1 and a collecting cavity S2, the sub-cavity S1 is provided as plurality in number, and the plurality of the sub-cavities S1 are separated from each other, the collecting cavity S2 is positioned at a side of the plurality of sub-cavities S1 close to the covering plate 52, and the collecting cavity S2 is communicated with the plurality of sub-cavities S1.

Referring to FIG. 7 and FIG. 8, the negative pressure container 51 is provided with ribbed plates inside, the ribbed plate separates the adjacent sub-cavities S1. The sub-cavity S1 has an opening at an end facing the covering plate 52. The collecting cavity S2 and the openings of the plurality of sub-cavities S1 are communicated.

The suction joint 6 and the collecting cavity S2 are communicated. When the vacuuming device works, the gases in the plurality of sub-cavities S1 are collected to the collecting cavity S2 under the action of negative pressure, then the gases enter into the vacuuming device via the suction joint 6. In other words, by providing the collecting cavity S2, one suction joint 6 can degas the plurality of sub-cavities S1.

Each connecting assembly 4 is communicated with one corresponding sub-cavity S1. Each connecting assembly 4 can communicate one battery 8 and one sub-cavity S1. In the degassing process, the electrolyte in each battery 8 brought out by gases is stored in one corresponding sub-cavity S1. The sub-cavities S1 of the negative pressure container 51 are separated from each other, so the electrolytes in the sub-cavities S1 are difficult to be mixed. When the formation process is finished, the electrolyte in each sub-cavity S1 flows back to the original battery 8, thereby improve the electrolyte capacity consistency of the batteries 8.

The number of the sub-cavities S1 is equal to or more than the number of the connecting assemblies 4. When the number of the batteries 8 changes, it only needs to increase or decrease the corresponding connecting assemblies 4. Therefore, the device for battery formation of the present disclosure has a better versatility.

Each sub-cavity S1 has an oval region at a lower end away from the covering plate 52. A cross-sectional area of the oval region is decreased gradually, this can increase the speed of the electrolyte flowing back to the battery 8, decrease remain and crystallization of the electrolyte, reduce the risk that the passage of the connecting assembly 4 is blocked in the process of long-term use.

Each sub-cavity S1 has the opening communicated with the collecting cavity S2, so in the degassing process, the electrolyte in one sub-cavity S1 may be sputtered to other sub-cavity S1 under the action of the gases, thereby influencing the electrolyte capacity consistency of the batteries 8. Therefore, preferably, the negative pressure mechanism 5 further comprises a separating plate 53, the separating plate 53 is received in the collecting cavity S2, and the separating plate 53 only covers a part of the opening of each sub-cavity S1.

The separating plate 53 may abut on the ribbed plates inside the negative pressure container 51. In a width direction Y, a dimension of the separating plate 53 is smaller than a dimension of the collecting cavity S2; in other words, a gap is kept between the separating plate 53 and an outer wall encircling the collecting cavity S2.

In the present disclosure, the separating plate 53 can cover a part of the opening of each sub-cavity S1, so the separating plate 53 can reduce the risk that the electrolyte sputters to other sub-cavity S1, improve electrolyte capacity consistency of the batteries 8. In addition, the separating plate 53 only covers a part of the opening of the sub-cavity S1, so in the degassing process, the gases in the sub-cavities S1 still can flow into the collecting cavity S2.

Figure 9:
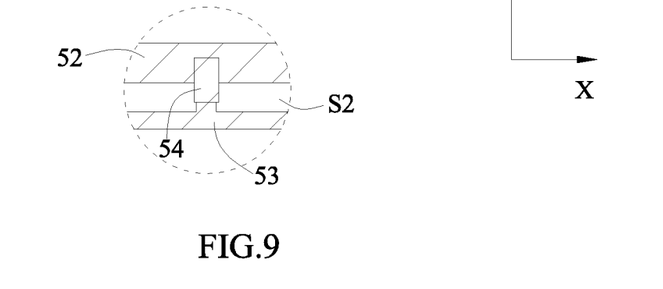
FIG. 9 is an enlarged view of a part of FIG. 7 within a round frame A.

Referring to FIG. 9, the negative pressure mechanism 5 further comprises a limiting member 54, the limiting member 54 is connected with the separating plate 53 and provided between the separating plate 53 and the covering plate 52. An upper end of the limiting member 54 abuts on the covering plate 52, and a lower end of the limiting member 54 abuts on the separating plate 53. In the degassing process, the limiting member 54 can avoid the separating plate 53 vibrating up and down in the height direction Z under the action of negative pressure, and prevent the separating plate 53 blocking a suction opening of the suction joint 6. The limiting member 54 may be in the shape of prism or others, an area of the limiting member 54 is smaller than an area of the separating plate 53; the position of the limiting member 54 should avoid the position of the suction joint 6.

The limiting member 54 can be fixed with the separating plate 53 by threaded connection, bonding and the like; certainly, the limiting member 54 and the separating plate 53 also can be formed integrally.

Referring to FIG. 7 to FIG. 10, the negative pressure container 51 has a plurality of connecting portions 511 protruding at an end away from the covering plate 52, and the number of the connecting portions 511 is equal to the number of the sub-cavities S1. Each connecting portion 511 is in the shape of cylinder.

Figure 10:
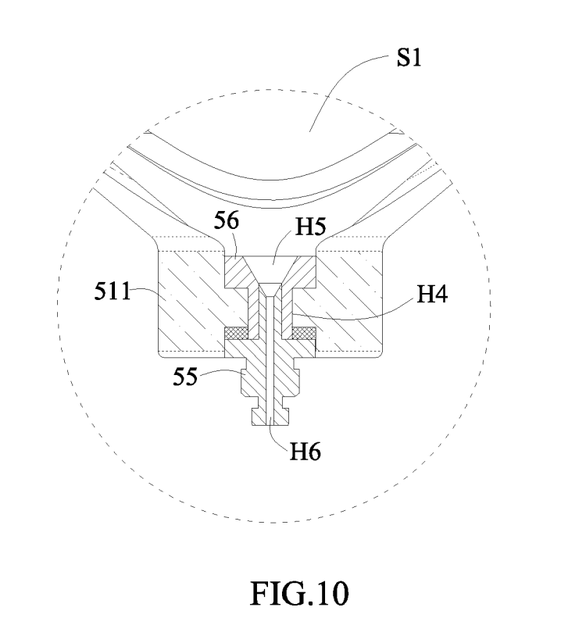
FIG. 10 is an enlarged view of a part of FIG. 7 within a round frame B.

Each connecting portion 511 is positioned at a side of one corresponding sub-cavity S1 away from the covering plate 52 and has a fourth through-hole H4 communicated with the sub-cavity S1. The fourth through-hole H4 has regions with different diameters.

Figure 11:
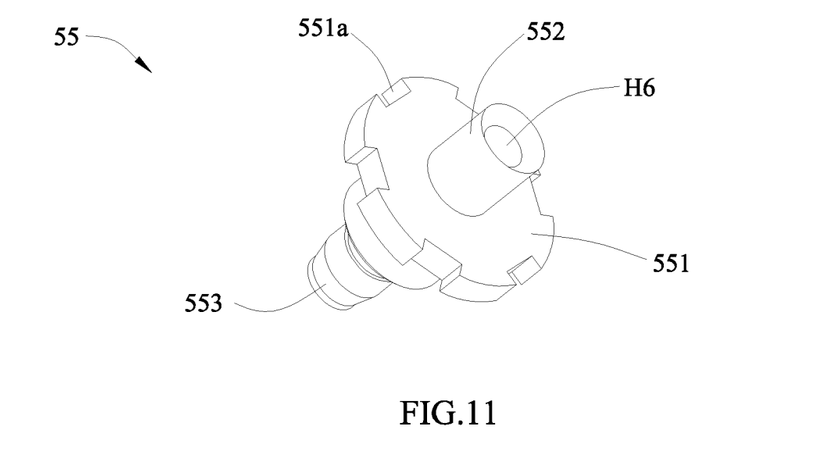
FIG. 11 is a schematic view of a connection joint of the device for battery formation according to the present disclosure.

The negative pressure mechanism 5 further comprises a connection joint 55 and a fastener 56, the connection joint 55 has a flange 551, a first extending portion 552 and a second extending portion 553, the first extending portion 552 extends from a side of the flange 551 close to the connecting portion 511, the second extending portion 553 extends from a side of the flange 551 away from the connecting portion 511.

Figure 12:
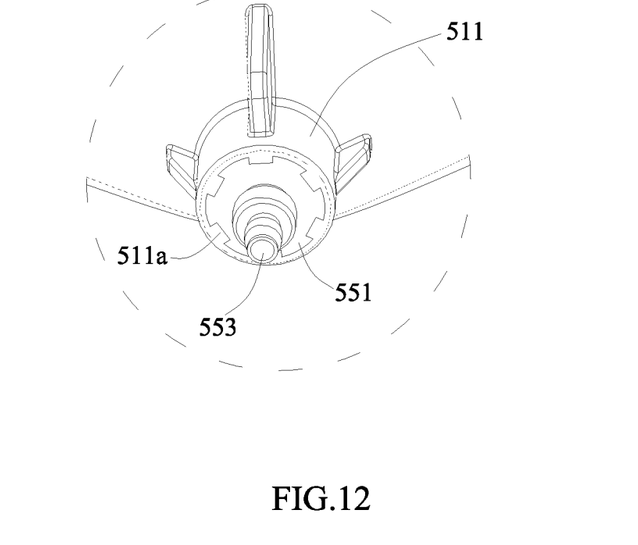
FIG. 12 is a schematic view of the connection joint and the negative pressure container, which are connected together, of the device for battery formation according to the present disclosure.

The fastener 56 is received in the fourth through-hole H4 and has a fifth through-hole H5, the fifth through-hole H5 is communicated with the sub-cavity S1. The flange 551 is inserted into the fourth through-hole H4, the first extending portion 552 is inserted into the fifth through-hole H5 and connected with the fastener 56 by thread. A gasket may be provided between the flange 551 and the connecting portion 511. The connection joint 55 has a sixth through-hole H6 passing through the first extending portion 552, the flange 551 and the second extending portion 553, the sixth through-hole H6 is communicated with the fifth through-hole H5.

By providing the connection joint 55, the present disclosure can simplify the connecting process of the connecting assembly 4 and the negative pressure mechanism 5. When it needs to install the connecting assembly 4, it directly fixes the connecting assembly 4 to the second extending portion 553 of the connection joint 55.

The flange 551 is provided with a notch 551a along a periphery, the connecting portion 511 has a protrusion 511a extending from a wall of the fourth through-hole H4, the protrusion 511a is inserted into the notch 551a. By providing the fit between the protrusion 511a and the notch 551a, the present disclosure can prevent the connection joint 55 rotating in the process of formation.

What is claimed is:

1. A device for battery formation, comprising a base plate, a press plate, a positioning block and a connecting assembly;
   the press plate being connected with the base plate, the positioning block and the connecting assembly each being provided as plurality in number, and the plurality of the connecting assemblies corresponding to the plurality of positioning blocks;
   the positioning block having a main portion and a protruding portion, the main portion being provided between the base plate and the press plate, and the protruding portion extending from a surface of the main portion away from the press plate;
   the base plate being provided with a plurality of positioning holes, and the protruding portion of each positioning block being inserted into the positioning hole;

each connecting assembly being provided to the main portion of a corresponding positioning block and used for being connected to a battery.

2. The device for battery formation according to claim 1, wherein
the main portion is provided with a first through-hole;
the connecting assembly comprises a first connecting pipe and a nozzle, one end of the first connecting pipe is connected with the nozzle, the other end of the first connecting pipe passes through the first through-hole of the main portion and is connected with the main portion.

3. The device for battery formation according to claim 2, wherein
the nozzle sheathes one end of the first connecting pipe, and an outer diameter of the other end of the first connecting pipe away from the nozzle is larger than a diameter of the first through-hole;
the connecting assembly further comprises a spring, the spring sheathes the first connecting pipe and is positioned between the nozzle and the main portion.

4. The device for battery formation according to claim 3, wherein the first connecting pipe is a metal pipe.

5. The device for battery formation according to claim 4, wherein
the connecting assembly further comprises a second connecting pipe, the second connecting pipe is connected with one end of the first connecting pipe away from the nozzle;
the second connecting pipe is a flexible pipe.

6. The device for battery formation according to claim 1, wherein
the nozzle is positioned at a side of the press plate away from the base plate;
the press plate is provided with a second through-hole in the shape of strip, the base plate is provided with a third through-hole in the shape of strip, the second through-hole and the third through-hole are respectively positioned at two sides of the first through-hole;
the first connecting pipes of the plurality of connecting assemblies pass through the second through-hole, and the third through-hole exposes one end of the first connecting pipe away from the nozzle.

7. The device for battery formation according to claim 6, wherein
the base plate has a groove, the groove is recessed relative to a surface of the base plate close to the press plate;
at least a part of the main portion of the positioning block is received in the groove;
the third through-hole and the positioning hole are formed to a bottom wall of the groove away from the press plate.

8. The device for battery formation according to claim 1, wherein the number of the positioning holes is greater than the total number of the protruding portions.

9. The device for battery formation according to claim 1, wherein the protruding portion of each positioning block is provided as plurality in number.

10. The device for battery formation according to claim 1, wherein
the device for battery formation further comprises a negative pressure mechanism, the negative pressure mechanism is positioned at a side of the base plate away from the press plate, and the negative pressure mechanism is connected with the base plate;
the plurality of connecting assemblies are connected with the negative pressure mechanism.

11. The device for battery formation according to claim 2, wherein
the device for battery formation further comprises a negative pressure mechanism, the negative pressure mechanism is positioned at a side of the base plate away from the press plate, and the negative pressure mechanism is connected with the base plate;
the plurality of connecting assemblies are connected with the negative pressure mechanism.

12. The device for battery formation according to claim 3, wherein
the device for battery formation further comprises a negative pressure mechanism, the negative pressure mechanism is positioned at a side of the base plate away from the press plate, and the negative pressure mechanism is connected with the base plate;
the plurality of connecting assemblies are connected with the negative pressure mechanism.

13. The device for battery formation according to claim 4, wherein
the device for battery formation further comprises a negative pressure mechanism, the negative pressure mechanism is positioned at a side of the base plate away from the press plate, and the negative pressure mechanism is connected with the base plate;
the plurality of connecting assemblies are connected with the negative pressure mechanism.

14. The device for battery formation according to claim 5, wherein
the device for battery formation further comprises a negative pressure mechanism, the negative pressure mechanism is positioned at a side of the base plate away from the press plate, and the negative pressure mechanism is connected with the base plate;
the plurality of connecting assemblies are connected with the negative pressure mechanism.

15. The device for battery formation according to claim 6, wherein
the device for battery formation further comprises a negative pressure mechanism, the negative pressure mechanism is positioned at a side of the base plate away from the press plate, and the negative pressure mechanism is connected with the base plate;
the plurality of connecting assemblies are connected with the negative pressure mechanism.

16. The device for battery formation according to claim 7, wherein
the device for battery formation further comprises a negative pressure mechanism, the negative pressure mechanism is positioned at a side of the base plate away from the press plate, and the negative pressure mechanism is connected with the base plate;
the plurality of connecting assemblies are connected with the negative pressure mechanism.

17. The device for battery formation according to claim 8, wherein
the device for battery formation further comprises a negative pressure mechanism, the negative pressure mechanism is positioned at a side of the base plate away from the press plate, and the negative pressure mechanism is connected with the base plate;
the plurality of connecting assemblies are connected with the negative pressure mechanism.

18. The device for battery formation according to claim 9, wherein
the device for battery formation further comprises a negative pressure mechanism, the negative pressure mechanism is positioned at a side of the base plate away from the press plate, and the negative pressure mechanism is connected with the base plate;
the plurality of connecting assemblies are connected with the negative pressure mechanism.

\* \* \* \* \*